United States Patent [19]

Kami et al.

[11] Patent Number: 4,717,171
[45] Date of Patent: Jan. 5, 1988

[54] WHEEL SUSPENSION FOR ROAD VEHICLES

[75] Inventors: Yozo Kami; Keinosuke Taki; Toshihumi Yamamoto, all of Tochigi, Japan

[73] Assignee: Honda Giken Kogyo Kabushiki Kaisha, Tokyo, Japan

[21] Appl. No.: 881,775

[22] Filed: Jul. 3, 1986

[30] Foreign Application Priority Data

| Jul. 3, 1985 | [JP] | Japan | 60-146321 |
| Jul. 3, 1985 | [JP] | Japan | 60-146322 |
| Jul. 3, 1985 | [JP] | Japan | 60-146323 |
| Jul. 3, 1985 | [JP] | Japan | 60-146330 |
| Jul. 3, 1985 | [JP] | Japan | 60-146331 |
| Jul. 3, 1985 | [JP] | Japan | 60-146332 |
| Jul. 4, 1985 | [JP] | Japan | 60-146969 |

[51] Int. Cl.$^4$ .................... B60G 1/00; B60G 3/00
[52] U.S. Cl. .................... 280/688; 280/696; 267/33; 180/73.4
[58] Field of Search ........... 280/696, 688, 668, 701, 280/690; 267/33, 140.2, 152; 180/73.4

[56] References Cited

U.S. PATENT DOCUMENTS

| 2,580,558 | 1/1952 | Kolbe | 280/696 |
| 3,327,803 | 6/1967 | Cote et al. | 180/73.4 |
| 3,679,017 | 7/1972 | Roe | 280/701 |
| 4,341,397 | 7/1982 | Morimura et al. | 280/688 |
| 4,453,733 | 6/1984 | Sautter et al. | 280/95 R |
| 4,641,854 | 2/1987 | Masuda et al. | 280/701 |

Primary Examiner—Richard A. Bertsch
Attorney, Agent, or Firm—Irving M. Weiner; Joseph P. Carrier; Pamela S. Burt

[57] ABSTRACT

A wheel suspension in a road vehicle having a frame includes a longitudinal arm extending substantially in a longitudinal direction of the vehicle and having a front end, a rear end, and an intermediate portion. The longitudinal arm also having, on the rear end, a member for supporting the wheel and, on the intermediate portion, a member for pivotally coupling the longitudinal arm to the frame. The wheel suspension further includes a guide assembly for controlling movement of the longitudinal arm in a transverse direction of the vehicle while allowing the rear end of the longitudinal arm to move substantially in a vertical direction. The guide assembly comprises a first lateral link having a first end coupled to the frame and a second end coupled to the front end of the longitudinal arm, the first lateral link extending substantially in the transverse direction of the vehicle, and a link assembly coupling the frame and the longitudinal arm to each other and cooperating with the first lateral link.

8 Claims, 21 Drawing Figures

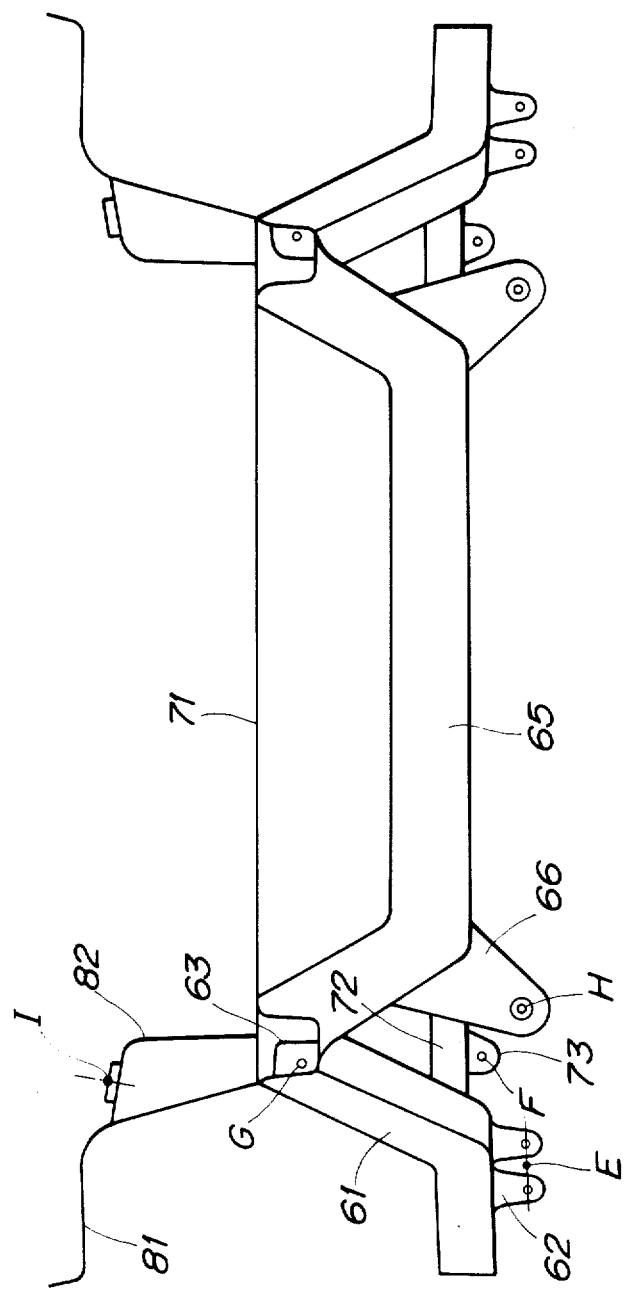

WHEEL SUSPENSION FOR ROAD VEHICLES

BACKGROUND OF THE INVENTION

1. Field of the Invention

The present invention relates to a wheel suspension for road vehicles, and more particularly to a rear wheel suspension having an arm called a trailing arm.

2. Description of the Relevant Art

There are known rear wheel suspensions comprising a trailing arm extending substantially in the fore-and-aft or longitudinal direction of a vehicle body in such known suspensions, the trailing arm has a front end pivotally mounted on a vehicle frame and a rear end supporting a rear wheel. Also, such suspensions are known to further comprise a guide means for guiding the trailing arm to control movement thereof laterally of the vehicle body while allowing the rear end of the trailing arm to move substantially in the vertical direction. The guide means comprises a plurality of lateral links each having one end coupled to the vehicle frame and the other end to the trailing arm. Examples of such rear wheel suspensions are disclosed in U.S. Pat. No. 3,327,803 and British Pat. No. 2,087,322. Each of the disclosed suspensions has at least two lateral links spaced apart from each other in the fore-and-aft direction of a road vehicle for preventing the wheel from toeing in or out excessively as the wheel moves up and down.

It is preferable for the rear one of the two lateral links to be attached to the trailing arm adjacent to the rear end thereof. However, there have been problems with respect to the arrangement of the front lateral link, as described below: With the suspension shown in the above U.S. patent, the front lateral link and the trailing arm are coupled at a position remote from the front end of the trailing arm, but close to the rear end thereof. This arrangement is poor in resistance to changes in the toeing of the wheel which are caused by side forces imposed on the wheel by the road surface. Where, on the other hand, the front lateral link is coupled to the trailing arm on the front end thereof that is connected to the vehicle frame, as disclosed in the above British Patent, the front lateral link is required to be quite small, with the result that substantial cost and labor must be expended to maintain a desired accuracy and mechanical strength of the small front lateral link.

SUMMARY OF THE INVENTION

The present invention has been made in an effort to solve the aforesaid problems.

Accordingly, it is an object of the present invention to provide a wheel suspension of the type referred to above, which is capable of presenting increased resistance to changes in the toeing of the wheel that would otherwise be caused by side forces applied to the wheel by the road surface.

Another object of the present invention is to provide a suspension of the type referred to above, which is suitable for use as a rear wheel suspension in an automobile.

According to the present invention, the above object can be achieved by a wheel suspension in a road vehicle having a frame, comprising: a longitudinal arm extending substantially in a longitudinal direction of the vehicle and having a front end, a rear end, and an intermediate portion, the longitudinal arm also having, on the rear end, means for supporting the wheel and, on the intermediate portion, means for pivotally coupling the longitudinal arm to the frame; guide means for controlling movement of the longitudinal arm in a transverse direction of the vehicle while allowing the rear end of the longitudinal arm to move substantially in a vertical direction; the guide means comprising a first lateral link having a first end coupled to the frame and a second end coupled to the front end of the longitudinal arm, the first lateral link extending substantially in the transverse direction of the vehicle, and link means coupling the frame and the longitudinal arm to each other and cooperating with the first lateral link.

The above and further objects, details and advantages of the present invention will become apparent from the following detailed description of a preferred embodiment thereof, when read in conjunction with the accompanying drawings.

BRIEF DESCRIPTION OF THE DRAWINGS

FIGS. 5 through 7 are plan, side elevational, and rear elevational views of a rear portion of a vehicle frame suitable for mounting the suspension of FIG. 1 thereon.

DETAILED DESCRIPTION OF THE PREFERRED EMBODIMENT

Figure 1:
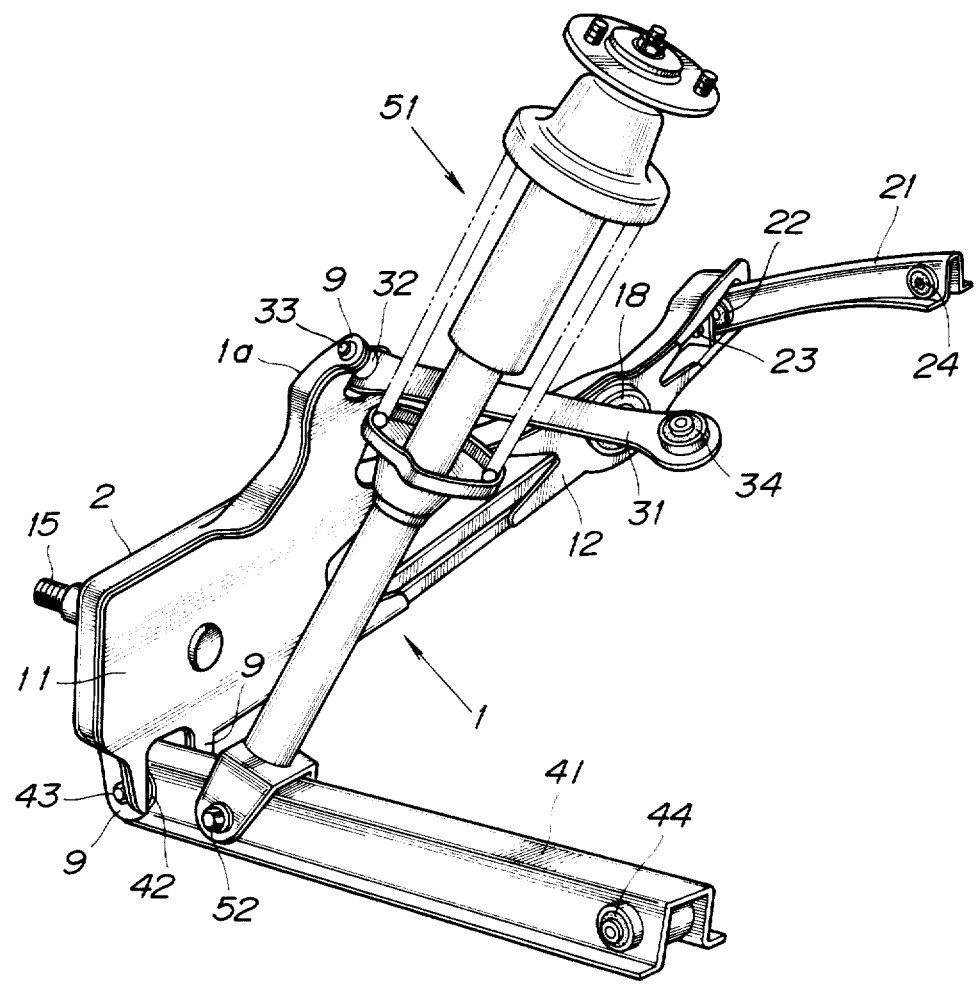
FIG. 1 is a perspective view of a suspension according to a preferred embodiment of the present invention.

FIGS. 1 through 4 illustrate a suspension according to a preferred embodiment of the present invention. The suspension has a trailing arm 1 extending substantially in the longitudinal direction of a road vehicle and having front and rear ends coupled to a vehicle frame by three lateral links 21, 31, 41 extending substantially in the transverse direction of the road vehicle. The trailing arm 1 has an intermediate portion pivotally mounted by a rubber bushing 18 on the vehicle frame. The trailing arm 1 includes a main plate 2 having a vertically extending surface and a peripheral flange. The trailing arm 1 is formed by pressing a steel plate. Two gusset plates 11, 12 are secured to the flange of the main plate 2 respectively on a rear portion of the trailing arm and an intermediate portion thereof which is slightly close to the front end thereof. A wheel 16 is rotatably supported on a spindle 15 fixed to the main plate 2 and the gusset 11. The rubber bushing 18, by which the trailing arm 1 is pivotally mounted on the vehicle frame, is secured to the other gusset plate 12 and the main plate 2. The rubber bushing 18 is of the same type as that of a rubber bushing employed in a coupling between a link and an arm of a conventional suspension. The rubber bushing 18 comprises a substantially cylindrical rubber block having an inner bushing shell and an outer bushing shell.

Figure 3:
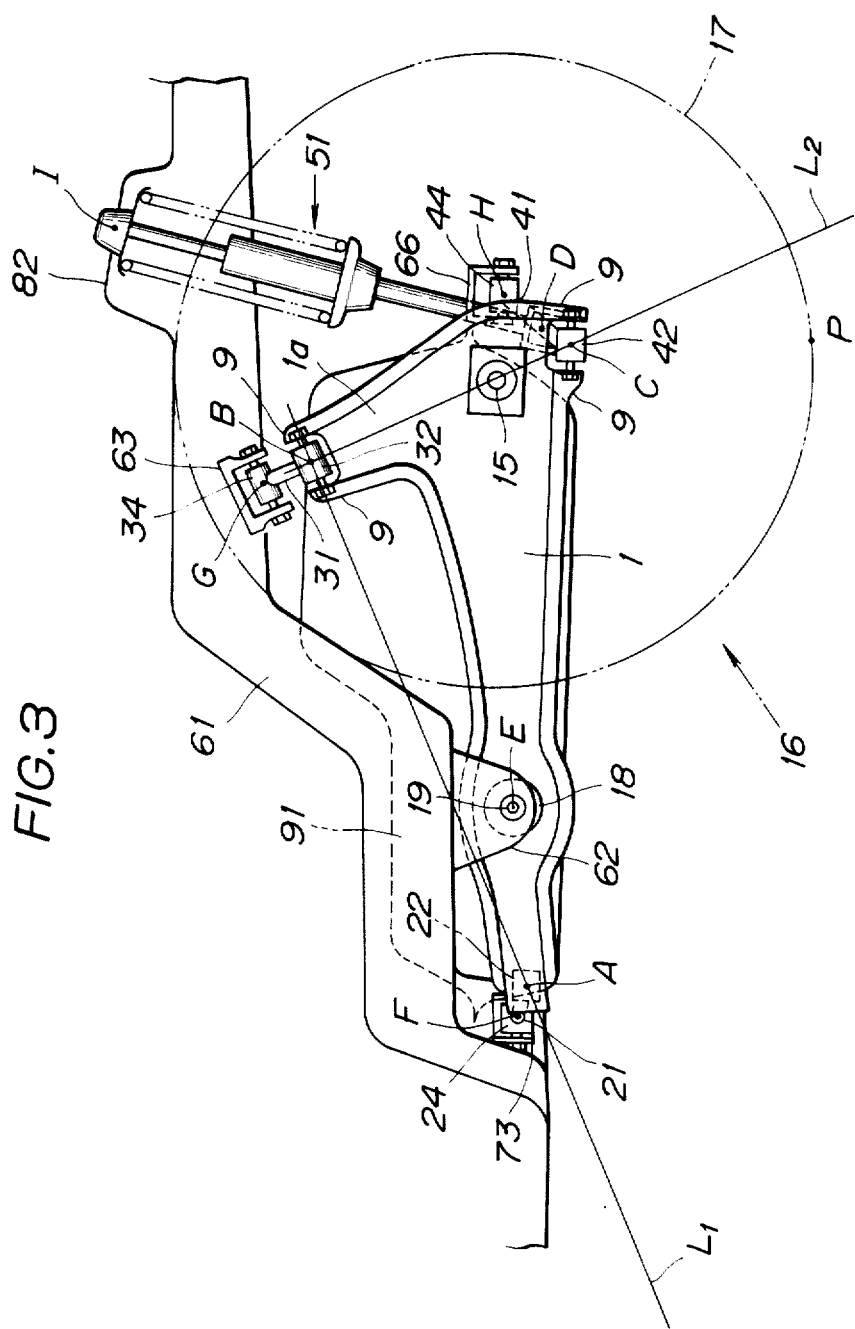
FIG. 3 is a side elevational view of the suspension shown in FIG. 1 and the vehicle frame portion on which the suspension is mounted.

As best shown in FIG. 3, the trailing arm 1 has a projection 1a projecting upwardly and forwardly from the rear end thereof. The trailing arm 1 also has attachment structures respectively on the front end thereof, the upper end of the projection 1a, and the lower portion of the rear end of the trailing arm 1, the lateral links 21, 31, 41 being pivotally coupled to the trailing arms 1 by these attachment structures. Each of the attachment structures comprises a pin engaging a bushing on the outer end of one of the lateral links and a support which rigidly supports the pin. In the two rear attachment structures, the supports comprise respective pairs of front and rear fingers 9 each supporting the ends of the pin. Each pair of front and rear fingers 9 comprises a pair of finger members integral with the main plate 2 and another pair of identically shaped finger members integral with the gusset plate 11 and held against the finger members of the main plate 2. With the fingers 9 thus formed, no brackets are required on the trailing arm 1 for supporting the lateral links, resulting in a reduction of cost.

The attachment structure on the front trailing arm end is coupled at a point A to the lateral link 21 (hereinafter also referred to as a "front lateral link" or a "first lateral link"), the attachment structure on the upper end of the projection 1a is coupled at a point B to the lateral link 31 (hereinafter also referred to as an "upper lateral link" or a "second lateral link"), and the attachment structure on the lower portion of the rear trailing arm end is coupled at a point C to the lateral link 41 (hereinafter also referred to as a "lower lateral link" or a "third lateral link"). These coupling points will be indicated by A, B, C in the following description.

The rubber bushing 18 on the intermediate portion of the trailing arm 1 is anchored to the vehicle frame by a pin 19 rigidly supported on the vehicle frame, so that the trailing arm 1 is pivotally coupled to the vehicle frame at a point indicated at E. The trailing arm 1 itself has a sufficient degree of rigidity against loads applied longitudinally thereof, but the compliance of the rubber bushing 18 allows the trailing arm 1 to move slightly in the fore-and-aft direction thereof.

The three lateral links 21, 31, 41 are arranged to cooperate with each other in guiding the trailing arm 1 to control movement thereof in the transverse direction of the vehicle while allowing the rear end of the trailing arm 1 to move substantially in the vertical direction. The front lateral link 21 comprises a downwardly opening channel member formed from a steel plate, with rubber bushings 22, 24 having shells being fixed to the opposite ends thereof, the rubber bushings 22, 24 having parallel axes. The rubber bushing 22 on the outer end of the front lateral link 21 engages a pin 23 rigidly supported on the trailing arm 1 and had its axis oriented substantially toward the point E. Thus, the outer end of the front lateral link 21 is pivotally coupled to the front end of the trailing arm 1.

The upper lateral link 31 is in the form of a steel plate, and rubber bushings 32, 34 having shells are fixed at the opposite ends of the upper lateral link 31. The upper lateral link 31 is coupled to the upper portion of the rear end of the trailing arm 1 with the rubber bushing 32 on the outer end of the upper lateral link 31 engaging a pin 33 rigidly supported on the trailing arm 1 and having its axis oriented substantially toward the point E.

The lower lateral link 41 comprises a downwardly opening channel member formed from a steel plate, with rubber bushings 42, 44 having shells being fixed to the opposite ends thereof. The rubber bushings 42, 44 have parallel axes. The rubber bushings 42 on the outer end of the lower lateral link 41 engages a pin 43 rigidly supported on the trailing arm 1 and having its axis oriented substantially toward the point E. Thus, the outer end of the lower lateral link 41 is pivotally coupled to the lower portion of the rear end of the trailing arm 1. Of these three links 21, 31, 41, the front lateral link 21 is the shortest, and the lower lateral link 41 is the longest.

A spring damper unit 51 has a lower end pivotally coupled to the lower lateral link 41 at a point D which is located closely to the outer end thereof. Therefore, the spring damper unit 51 is positioned behind the upper lateral link 31.

Figure 5:
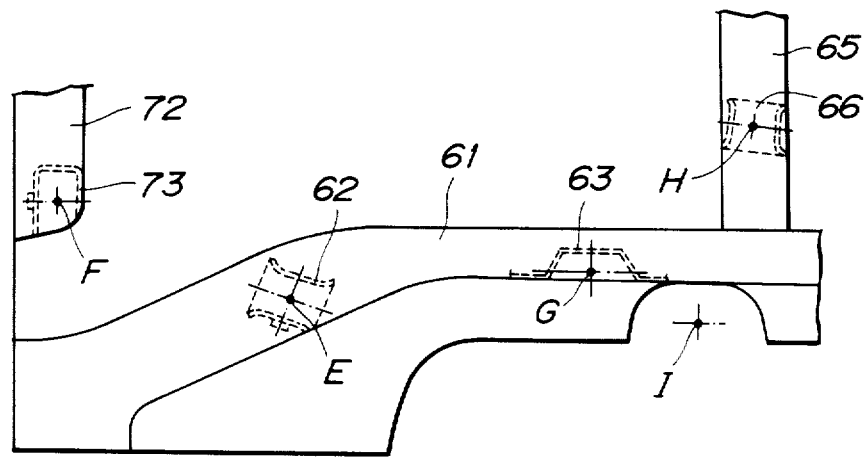
Figure 6:
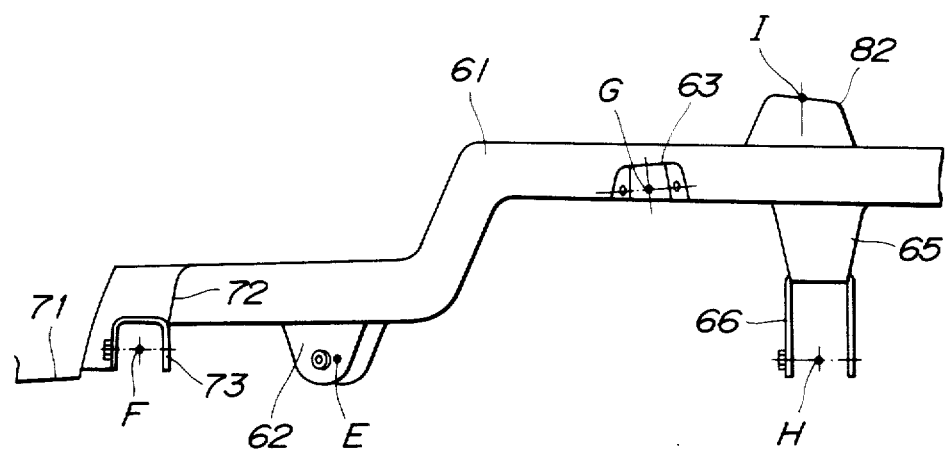

Connections of the trailing arm 1, the lateral links 21, 31, 41, and the spring damper unit 51 to a vehicle frame will be described below with reference to FIGS. 5 through 7. FIGS. 5 through 7 show components of only a rear portion of the vehicle frame. Since the vehicle frame is symmetrical with respect to the longitudinal central axis thereof, only a lefthand portion of the rear frame portion is illustrated in FIG. 5.

The rear frame portion includes a pair of lateral rear frame members 61 coupled to each other by a rear floor cross member 72 and a rear cross member 65, these cross members 72, 65 extending transversely of the vehicle. The rear floor cross member 72 has its opposite ends fixed to the respective rear frame members 61 closely to front ends thereof. The rear cross member 65 has its opposite ends fixed to the respective rear frame members 61 closely to rear ends thereof.

A bracket 62 is secured to a lower surface of each of the rear frame members 61. The bracket 62 supports the anchor pin 19 inserted through the rubber bushing 18 on the intermediate portion of the trailing arm 1. The axis of the anchor pin 19 lies horizontally and is directed substantially transversely of the vehicle with its inner end positioned slightly behind the outer end thereof. Another bracket 73 is secured to an end of the rear floor cross member 72 attached to a front portion of a rear floor 71 which is located forwardly of the anchor pin 19. The bracket 73 supports a pin 25 inserted through and engaging the rubber bushing 24 on the inner end of the front lateral link 21. The inner end of the front lateral link 21 is thus pivotally coupled to the vehicle frame at a point F. Another bracket 63 is fixed to an outer surface of the rear frame member 61 forward of the rear cross member 65. The bracket 63 supports the pin 35 inserted through and engaging the rubber bushing 34 on the inner end of the upper lateral link 31. Therefore, the inner end of the upper lateral link 31 is pivotally coupled to the vehicle frame at a point G. A bracket 66 is fixed to a lower surface of the rear cross member 65 closely to an end thereof. The bracket 66 supports a pin 45 inserted through the rubber bushing 44 on the inner end of the lower lateral link 41, so that the inner end of the lower lateral link 41 is pivotally joined to the vehicle frame at a point H. The upper end of the spring damper unit 51 is connected to a point I to a damper housing 82 formed on a wheel housing 81 positioned substantially outwardly of the rear cross member 65.

Beneath the rear floor 71 of the rear vehicle portion, there is disposed a fuel tank 91 (FIGS. 3 and 4) in a space in front of the rear cross member 65. The point F where the front lateral link 21 is coupled to the vehicle frame is positioned forwardly of the fuel tank 91, whereas the point H where the lower lateral link 41 is coupled to the vehicle frame is positioned rearwardly of the fuel tank 91. The point G where the upper lateral link 31 is joined to the vehicle frame is located above the fuel tank 91. The trailing arm 1 extends along one side wall of the fuel tank 91.

Since the front lateral link 21 is coupled to the trailing arm 1 forwardly of the point E where the trailing arm 1 is joined to the vehicle frame, the span or distance between the lower lateral link 41 coupled to the rear end of the trailing arm 1 and the front lateral link 21 is substantially large, resulting in sufficiently high resistance to changes in the toeing of the wheel 16, which would otherwise be induced by side forces F (FIG. 4) acting on a ground-contacting point 17 on the wheel 16.

Furthermore, inasmuch as the front, upper, and lower lateral links 21, 31, 41 are coupled respectively to the rear floor cross member 72, the rear frame 61, and the rear cross member 65, as described above, the vertical span between the upper lateral link 31 and the lower lateral link 41 is large, resulting in high resistance to changes in the camber of the wheel which would otherwise be caused by the side forces F.

There are no limitations on the lengths of the front lateral link 21 and the lower lateral link 41 because these links extend transversely of the vehicle and are coupled respectively to the cross members 72, 65.

As described above, the points F, G, H are positioned forwardly, upwardly, and rearwardly, respectively, of the fuel tank 91. This arrangement allows the fuel tank and suspensions to be laid out effectively for the elimination of a dead space.

As the point F is located forwardly of the fuel tank 91, the fuel tank 91 does not impose any limitations on the length of the front lateral link 21, and it can have a desirably large fuel storage capacity. As a result, the front lateral link 21 may have such a sufficient length that any displacement of the front end of the trailing arm 1 in the transverse direction of the vehicle, produced by bounding and rebounding of the wheel 16, can be reduced to minimize any changes in wheel alignment. This advantage is amplified by the fact that the point H is located behind the fuel tank 91. Since the lower lateral link 41 may also be sufficiently long, any displacement of the rear end of the trailing arm 1 upon operation of the suspension can also be reduced for thereby holding wheel alignment variations to a minimum.

The geometries of the trailing arms and lateral links of suspensions will be described with reference to FIGS. 8 through 12. In these figures, the arms and links are diagrammatically indicated by straight lines, the arrow marked by "FRONT" indicates the forward direction of the vehicle, and the arrow marked by "LEFT" indicates the leftward direction of the vehicle.

Figure 8A:
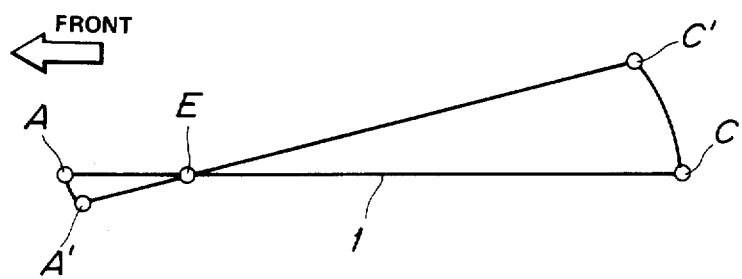
FIGS. 8 through 13 are schematic diagrams explaining the geometry of the suspension of FIG. 1 in comparison with the geometries of other suspensions.
Figure 8B:
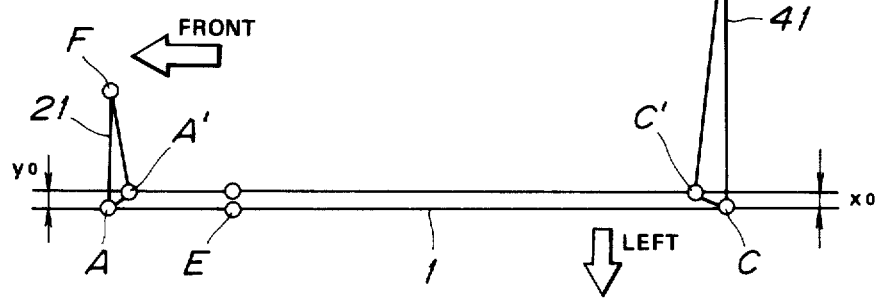
Figure 8C:
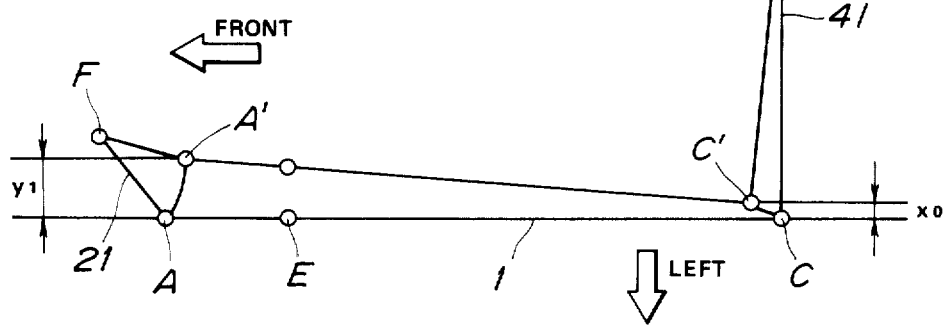

FIGS. 8(a) through 8(c) are illustrative of the attitude of the front lateral link 21. In the suspension of the embodiment, the point F where the front lateral link 21 is coupled to the vehicle frame is positioned forwardly of the point A where the front lateral link 21 is coupled to the trailing arm 1. This arrangment permits the wheel 16 to toe in to a relatively large extent when it bounds and rebounds. FIG. 8(b) shows a suspension in which the front lateral link has an attitude different from that of the front lateral link shown in FIG. 8(a). More specifically, where the front and lower lateral links 21, 41 are parallel to the transverse direction of the vehicle as illustrated in FIG. 8(b), the point A is shifted to a point A' and the point C to a point C' when the trailing arm 1 is angularly moved about the point E as the wheel bounds and rebounds, as shown in FIG. 8(a). As a result, the distance y0 by which the front end of the trailing arm 1 is moved toward the longitudinal central axis of the vehicle is slightly larger than the distance x0 by which the rear end of the trailing arm 1 is moved in the same direction, so that the extent of toe-in of the wheel is small. According to the geometry of an embodiment shown in FIG. 8(c), the front lateral link 21 is inclined as viewed in plan, and hence the distance y1 by which the front end of the trailing arm 1 is moved toward the longitudinal cental axis of the vehicle is substantially larger than the distance y0 (FIG. 8(b)). This allows the wheel to toe in to a larger extent.

Figure 9A:
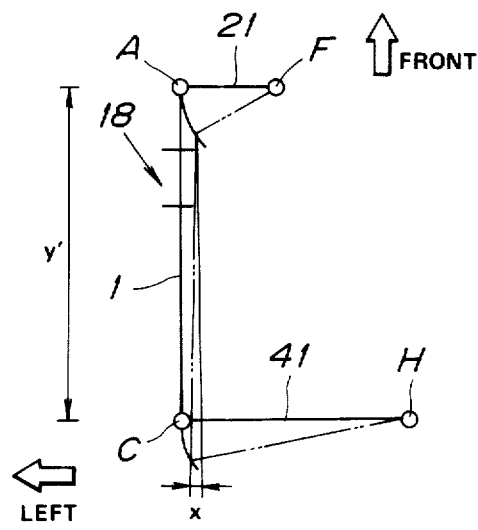

There are other various factors which determine changes in the toeing in of the wheel during operation of the suspension, and the desired extent of toe-in varies from suspension to suspension. To achieve optimum changes in the toeing in of the wheel on a certain suspension, there are employed both a means for increasing toe-in and a means for reducing toe-in. FIG. 9(a) shows an arrangement of the present embodiment for suppressing changes in the toeing in of the wheel. According to the illustrated arrangement, the trailing arm 1 has a sufficient degree of rigidity against loads imposed in the longitudinal direction thereof, and the front and lower lateral links 21, 41 are pivotally coupled respectively to the front and rear ends of the trailing arm 1 at respective points A, C. Therefore, the longitudinal span or distance y' between the points A, C is maximum, and since the trailing arm 1 is rigid in the longitudinal direction, the span y' remains unchanged when the wheel is pulled rearwardly during vehicle operation.

Where the compliance of the rubber bushing 18 by which the trailing arm 1 is pivotally coupled to the vehicle frame is large, a change $\alpha'$ in the toe-in of the wheel as it is pulled backwards is indicated by:

$$\alpha' = \tan^{-1}(x/y).$$

Figure 9B:
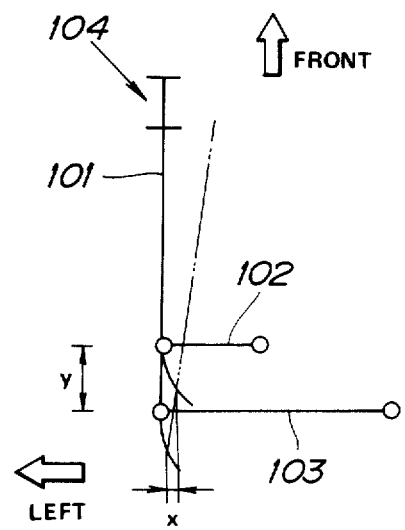

In comparison with a conventional arrangement of FIG. 9(b), since $$y' > y,$$

the relationship $$\alpha' < \alpha$$

results.

Therefore, even if the compliance of the rubber bushing is selected to be large, the wheel alignment, particularly the extent of toe-in of the wheel as it is pulled backwards, is not varied to a large extent.

This means that by allowing the toe-in to change to the same extent as that of the conventional arrangement, the compliance can be selected to be greater than the conventional compliance.

Figure 10A:
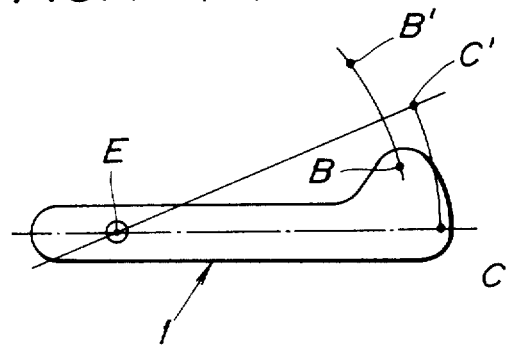
Figure 10B:
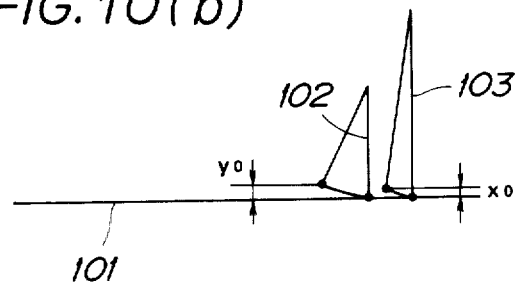
Figure 10C:
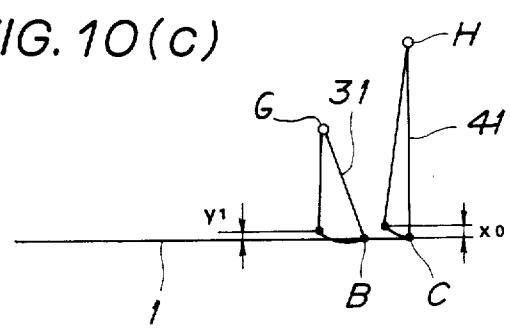

FIGS. 10(a) through 10(c) show upper lateral links, such as link 31. FIG. 10(b) is a diagrammatic representation of the geometry of a suspension in which an upper lateral link is of a different attitude than that of the suspension of the present embodiment. According to the arrangement of FIG. 10(b), a shorter upper lateral link 102 coupled to the upper portion of the rear end of a trailing arm 101 and a longer lower lateral link 103 coupled to the lower portion of the rear end of the trailing arm 101 have their axes extending parallel, as viewed in plan, to each other in the transverse direction of the vehicle. With such an arrangement, the distance y0 by which the upper portion of the rear end of the trailing arm 101 is moved toward the longitudinal central axis of the vehicle by the shorter upper lateral link 102 is larger than the distance x0 by which the lower portion of the rear end of the trailing arm 101 is moved in the same direction by the longer lower lateral link 103, with the result that the camber of the wheel tends to change to a relatively large extent.

Figure 2:
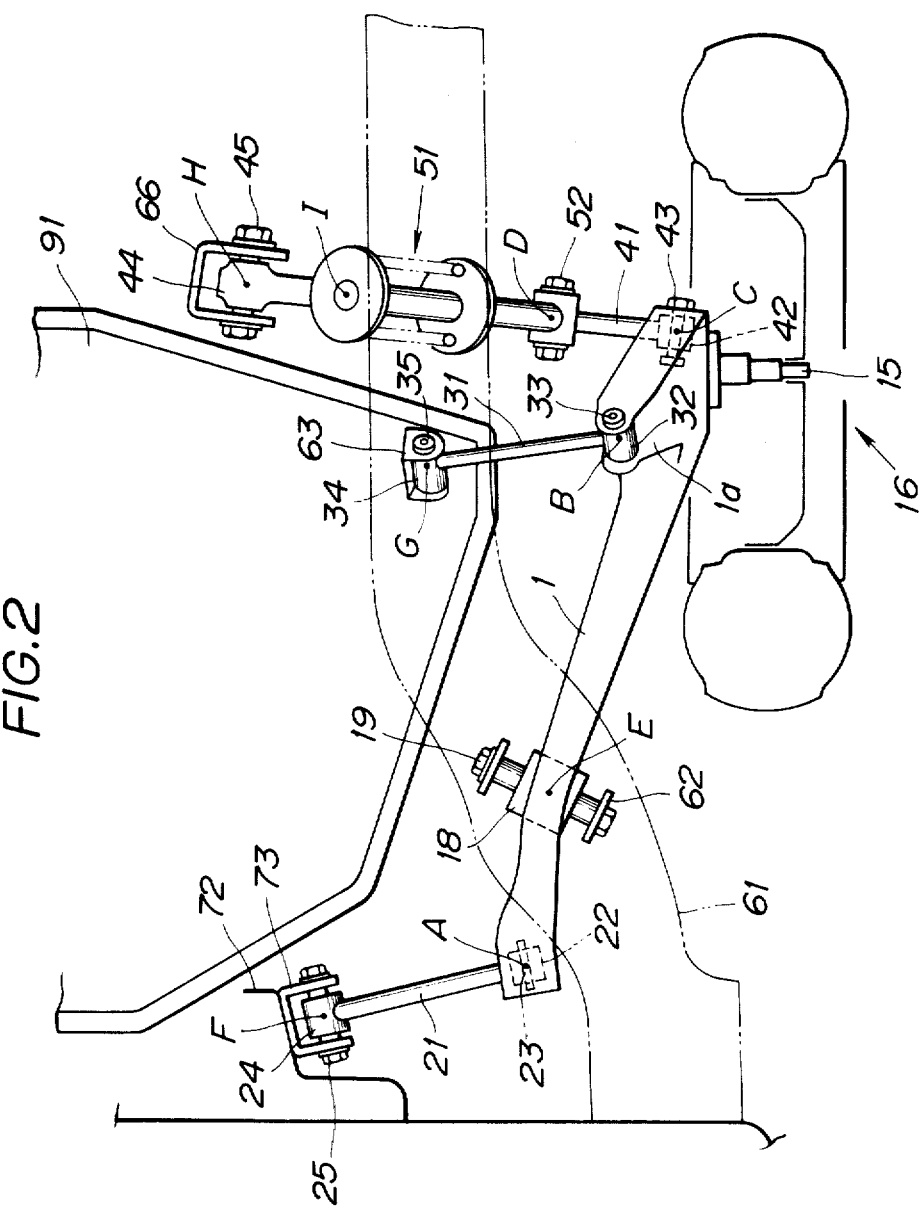
FIG. 2 is a plan view of the suspension shown in FIG. 1 and a portion of a vehicle frame on which the suspension is mounted.
Figure 4:
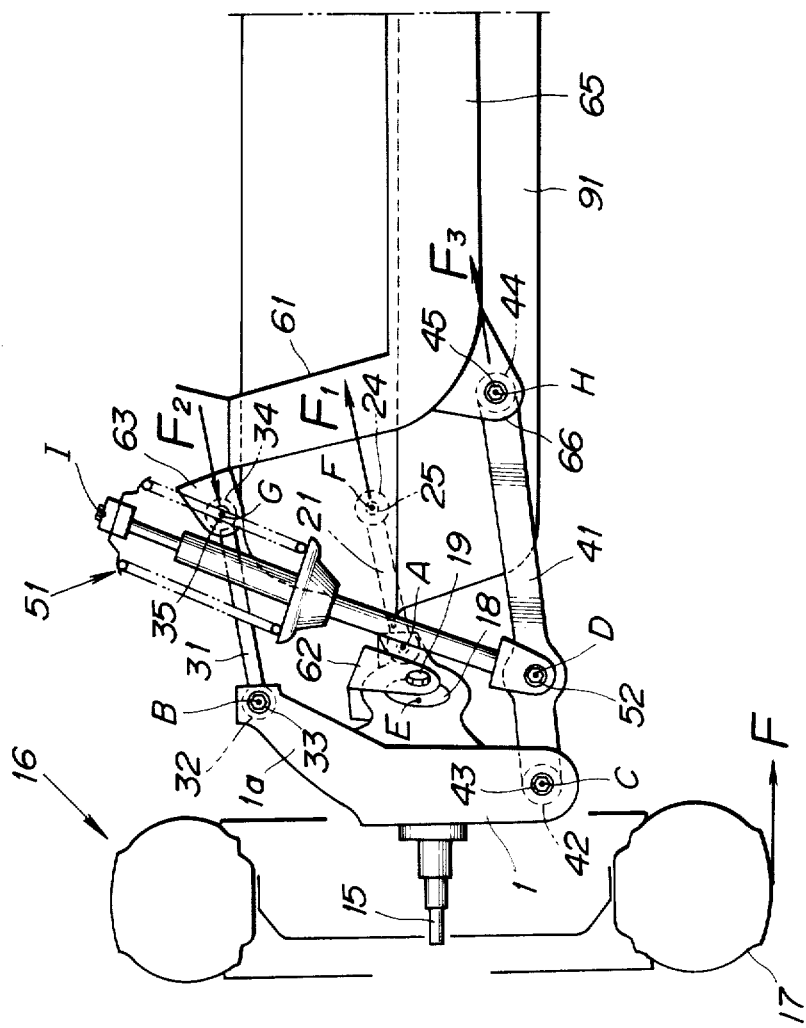
FIG. 4 is a rear elevational view of the suspension shown in FIG. 1 and the vehicle frame portion on which the suspension is mounted.

With the suspension of the present embodiment which is also shown in FIG. 10(c), the point G where the upper lateral link 31 is coupled to the vehicle frame is initially positioned forwardly and upwardly of the point B where the upper lateral link 31 is coupled to the trailing arm 1 at its upper portion of the rear end thereof (see FIGS. 2 through 4). Since the point G is thus positioned forwardly of the point B, i.e., closely to the point E where the trailing arm 1 is coupled to the vehicle frame, when the trailing arm 1 is angularly moved about the point E (as shown in FIG. 10(a)) upon bounding of the wheel 16, the point B is slightly displaced outwardly of the vehicle and then inwardly of the vehicle, thus following a path leading to a point B'. Therefore, the distance y1 by which the upper portion of the rear end of the trailing arm 1 is pulled by the upper lateral link 31 toward the longitudinal central axis of the vehicle is smaller than the distance y0 in the geometry of FIG. 10(b), with the consequence that any changes in the wheel camber can be reduced.

Figure 11A:
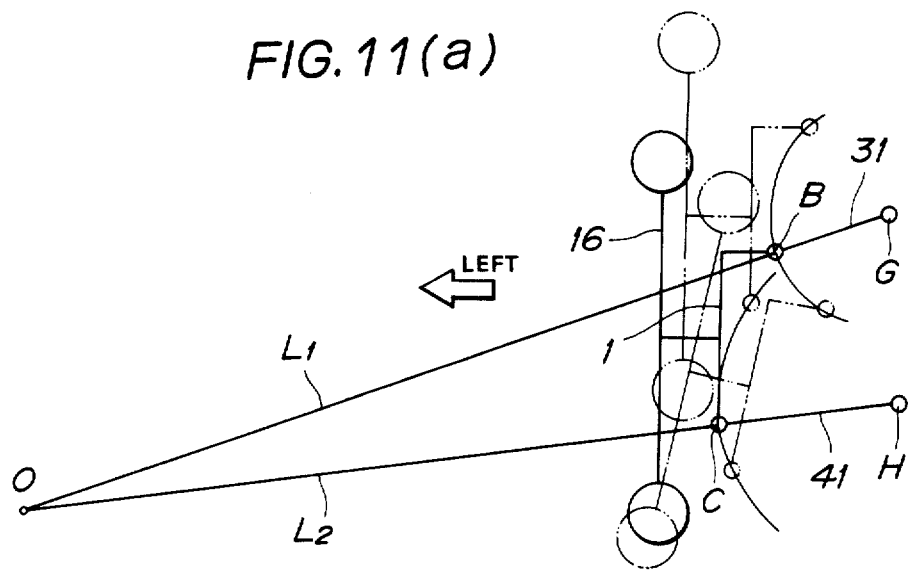
Figure 11B:
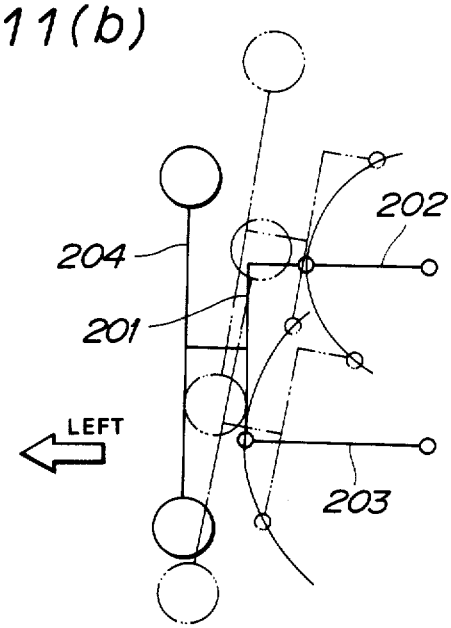

FIGS. 11(a) and 11(b) diagrammatically show upper and lower lateral links. FIG. 11(a) shows the geometry of the suspension according to the present embodiment, whereas FIG. 11(b) illustrates the geometry of a suspension in which upper and lower lateral links are of a different attitude than that of the suspension of FIG. 11(a). In the arrangement of FIG. 11(b), a shorter upper lateral link 202 coupled to the upper portion of the rear end of a trailing arm 201 and a longer lower lateral link 203 coupled to the lower portion of the rear end of the trailing arm 201 have their axes extending parallel, as viewed in rear elevation, to each other. Therefore, when a wheel 204 bounds, the trailing arm 201 is pulled by the upper lateral link 202 to a greater extent at the upper portion of the trailing arm 201 than at the lower portion toward the longitudinal central axis of the vehicle. This is apt to give the wheel 204 a relatively large negative camber angle. According to the suspension of the present embodiment diagrammatically shown in FIG. 11(a), the longitudinal axis L1 of the upper lateral axis 31 and the longitudinal axis L2 of the lower lateral link 41 are initially set so as to intersect at a point O outside of the vehicle, i.e., the wheel 16, as viewed in rear elevation. More specifically, the point B where the upper lateral link 31 is coupled to the trailing arm 1 is positioned below the point G where the upper lateral link 31 is coupled to the vehicle frame, and the point C where the lower lateral link 41 is coupled to the trailing arm 1 is positioned below the point H where the lower lateral link 41 is coupled to the vehicle frame, with the longitudinal axes L1, L2 of the links 31, 41 intersecting with each other, as described above. By thus arranging the shorter upper lateral link 31 coupled to the upper portion of the rear end of the trailing arm 1 and the longer lower lateral link 41 coupled to the lower portion of the rear end of the trailing arm 1, the wheel 16 as it bounds is angularly moved substantially about the point O, as shown in FIG. 11(a), thus reducing the negative camber angle. Accordingly, the negative camber angle produced when the wheel bounds is smaller than that of the parallel-link structure of FIG. 11(b).

The suspension described above can be provided with a mechanism for toe adjustment (i.e., for adjusting the extents of toe-in and toe-out) and a mechanism for camber adjustment. These adjustments may be made by changing the effective length of one or two lateral links, or displacing the point or points where the lateral link or links are coupled to the vehicle frame, in the transverse direction of the vehicle. These adjustments can be achieved by known adjustment constructions. However, it would be inconvenient to accomplish automatic adjustment of one parameter which is caused of necessity by adjustment of another parameter. Stated otherwise, it is preferable to provide independent parameter adjustability. In view of this, it is more preferable to displace the points where the lateral links are coupled to the vehicle frame than to change the effective lengths of the lateral links, since changing the effective lengths of the lateral links would have a substantial effect on the characteristics of changing of the wheel alignment angle caused by the operation of the suspension, i.e., would considerably alter the characteristics of changing of the wheel alignment angle. Furthermore, in view of the above independent adjustability, it is preferable to effect toeing adjustment by displacing the point F where the front lateral link 21 is coupled to the vehicle frame because, as can easily be understood from FIG. 3, the toeing is determined substantially by the front and lower lateral links 21, 41, and changing the position of the front lateral link 21 does not have a substantial effect on camber whereas changing the position of the rear lateral link 41 has a substantial effect on camber. For the same reason, camber adjustment should preferably be carried out by displacing the point G where the upper lateral link 31 is coupled to the vehicle frame.

Figure 12A:
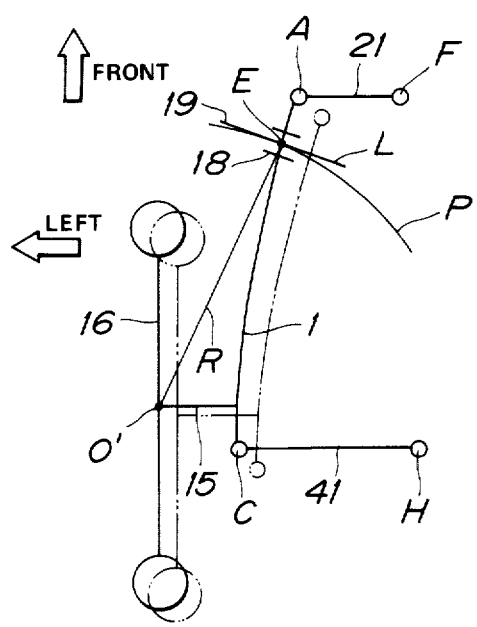
Figure 12B:
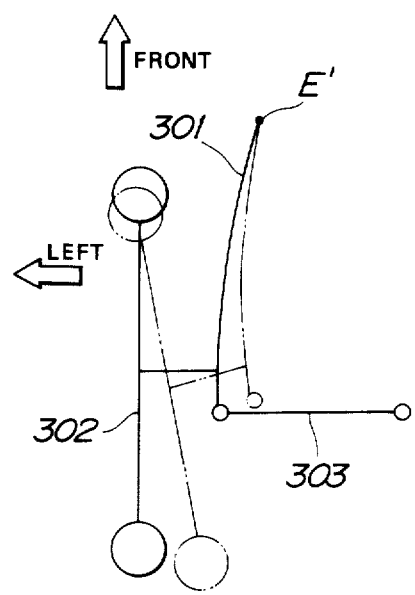

FIGS. 12(a) and 12(b) show coupling structures between trailing arms and vehicle frames and an anchor pin employed in such a coupling structure and by which a rubber bushing, such as 18, is anchored to the vehicle frame. FIG. 12(a) is a diagrammatic representation of the suspension of the present embodiment, and FIG. 12(b) diagrammatically shows a suspension in which the above coupling structure and the arrangement of lateral links are different from those of FIG. 12(a). In the suspension shown in FIG. 12(b), when the wheel bounds and rebounds, a point E' where the front end of a trailing arm 301 is pivotally coupled to a vehicle frame remains immovable. Therefore, the rear end of the trailing arm 301 is caused, by a lower lateral link 303 coupled to the rear end thereof, to move toward the longitudinal central axis of the vehicle, with the result that the wheel 302 will toe out. According to the suspension of the present embodiment, however, the three links are arranged to prevent the wheel from changing its toeing and, when the wheel bounds and rebounds, the trailing arm is caused to be translated inwardly and rearwardly due to the compliance of the rubber bushing by which the trailing arm is pivotally coupled to the vehicle frame. The point at which the trailing arm is coupled to the vehicle frame is subjected at this time to least resistance when moved about the center of rotation of the wheel. Therefore, the axis of the rubber bushing does not extend parallel to the transverse direction of the vehicle. Otherwise, the rubber bushing would undergo shearing stresses in the axial direction and compressive forces in a direction normal to the axial direction, and the trailing arm would not necessarily be smoothly displaced inwardly and rearwardly.

More specifically, in the suspension of the present embodiment, as shown in FIG. 12(a), the axis L of the anchor pin 19 at the point E where the trailing arm 1 is coupled to the vehicle frame is positioned, as viewed in plan, tangentially to an arc P with its center of curvature aligned with the center O' of rotation of the wheel 16, i.e., the anchor pin 19 extends at the point E perpendicularly to the radius R of curvature of the arc P, as viewed in plan. By thus inclining the anchor pin 19 at the point E as viewed in plan, only shearing stresses are applied to the rubber bushing 18 in the direction of the axis L when the wheel 19 bounds and rebounds, allowing the trailing arm 1 to be smoothly moved inwardly and rearwardly along the axis L. When the wheel 16 bounds and rebounds, the trailing arm 1 is caused by the front and lower lateral links 21, 41 to move without substantially changing the toeing (strictly, with small toe-in). At this time, since the longitudinal axis L of the rubber bushing 18 on the trailing arm 1 is tangential, as viewed in plan, to the arc P with its center of curvature aligned with the center O' of rotation of the wheel 16, the rubber bushing 18 is subjected to shearing stresses applied in the axial direction L. By designing the rubber bushing 18 such that it will be elastically deformable to a greatest extent in the axial direction L, the trailing arm 1 can easily be moved along the axis L.

Figure 13A:
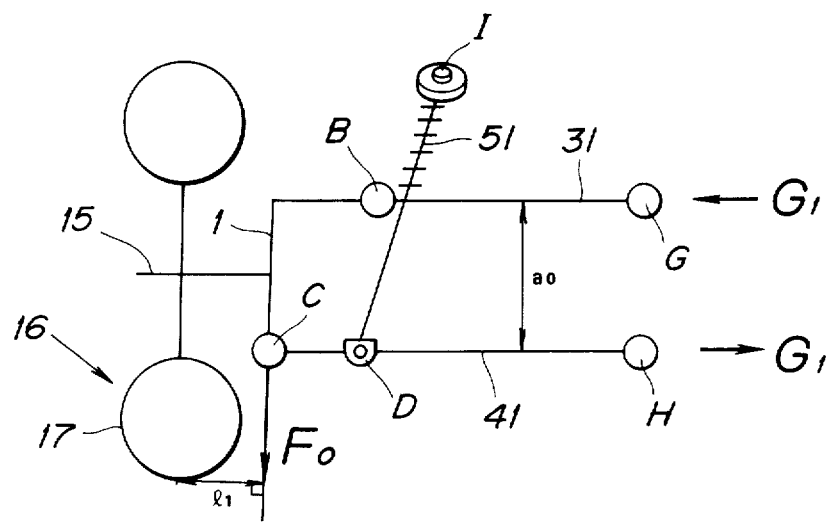
Figure 13B:
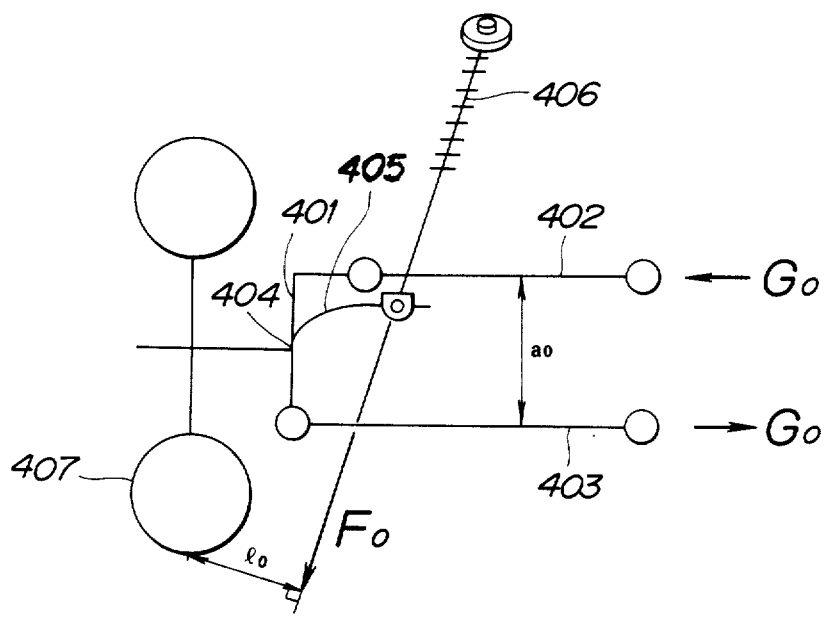

Advantages accruing from the arrangement by which the spring damper unit 51 (hereinafter referred to simply as a "damper") of the suspension of the present embodiment will be described with reference to FIGS. 3, 4, 13(a) and 13(b). FIG. 13(a) diagrammatically depicts the damper 51 of the suspension according to the present embodiment and certain elements disposed therearound, and FIG. 13(b) diagrammatically shows a suspension which differs from the suspension of the present embodiment in that a damper is coupled to a wheel carrier on the rear end of a trailing arm, but not to a lower lateral link.

On small-size passenger automobiles, the upper end of the damper of a rear suspension is normally coupled to the wheel house for a rear wheel. In the case where the lower end of a damper 406 is coupled to the upper portion of a wheel carrier 404 as shown in FIG. 13(b), the damper 406 is positioned in a relatively upper position, and hence the upper portion of the damper 406 must be located upwardly of the wheel house, i.e., must project into the passenger compartment, in order to provide an increased damper stroke for a sufficient dampening capacity. To avoid this drawback while maintaining a sufficient damper stroke, the damper would be required to be largely inclined as viewed in rear elevation. With the damper being largely inclined, a component force produced outwardly of the vehicle by a reactive force from the damper is so increased as to adversely affect the wheel alignment, etc., when the damper operates. In the suspension of FIG. 13(b), upper and lower lateral links 402, 403 undergo forces G0 due to the reactive force F0 from the damper. Since the lower end of the damper 406 is coupled to an arm 405 projecting inwardly from the upper portion of the wheel carrier 404, $$G0 = Fo\ l0/a0$$

where a0 is the distance bewteen the upper and lower links 402, 403 and l0 is the length from the axis of the damper 406 to ground-contacting point of a tire 407.

Therefore, the upper lateral link 402 is subjected to a tensile force indicated by G0 whereas the lower lateral link 403 is subjected to a compressive force indicated by G0. The value of the force G0 is relatively large inasmuch as the length l0 is large.

According to the suspension of the present embodiment, on the other hand, the lower end of the damper 51 is pivotally coupled to the lower lateral link 41 which is pivotally coupled to the trailing arm 1 at the lowest point. Hence, the damper 51 can be lower than the damper shown in FIG. 13(b). As a consequence, the damper 51 can have an increased damper stroke for a sufficient dampening capability, while reducing the degree of projection of the upper damper portion into the passenger compartment. As the damper 51 is arranged, under normal condition, nearly vertically when viewed in rear elevation, any component of the reactive force exerted from the damper outwardly of the vehicle to adversely affect the wheel alignment, etc., is reduced when the damper operates.

Furthermore, the reactive force F0 of the damper 51 acts on the point C where the lower lateral link 41 is coupled to the trailing arm 1, as shown in FIG. 13(a). The force G1 acting on the upper and lower links 31, 41 is expressed by:

$$G1 = F0\ l1/a0$$

where a0 is the vertical distance between the upper and lower lateral links 31, 41, and l1 is the length of an arm extending from a perpendicular from the point C where the reactive force F0 acts to the ground-contacting point of a tire 17. As is apparent from comparison between FIGS. 13(a) and 13(b), $l1 < l0$, and hence $G1 < G0$.

Therefore, the loads imposed on the links by the reactive force of the damper 51 are smaller than those in the suspension of FIG. 13(b).

In the embodiment of the invention, inasmuch as the upper lateral link 31 is positioned forwardly of the damper 51, a point P where the side force F acts from the road surface on the wheel 16 when the wheel 16 moves along a curve is positioned in a region below and between a straight line L1 interconnecting the points A, B where the front and upper lateral links 21, 31 are coupled to the trailing arm 1, and a straight line L2 interconnecting the points B, C where the upper and lower lateral links 31, 41 are coupled to the trailing arm 1, as shown in FIG. 3.

Due to equilibrium between moments about the straight line L1, an axial force F3 acts on the point H where the lower lateral link 41 is coupled to the vehicle frame, in the same direction as that of the side force F, as shown in FIG. 4. Due to equilibrium between moments about the straight line L2, an axial force F1 acts on the point F where the front lateral link 21 is coupled to the vehicle frame, in the same direction as the axial force F3, as shown in FIG. 4. As a result, an axial force F2 acts on the point G where the upper lateral link 31 is coupled to the vehicle frame, in the direction opposite to the axis forces F1, F3. Therefore, the forces are in equilibrium as follows:

$$F + F2 = F1 + F3$$

In a suspension, different from the suspension of the present embodiment, where the point P on which the side force F acts is positioned rearwardly of the straight line L2, the axial force on the lower lateral link 41 is equal to the sum of the side force F and the axial forces on the other two lateral links.

According to the suspension of the present embodiment, however, the axial forces F1, F2, F3 on the three lateral links are derived from the above equation as follows:

$$F1 = F + F2 - F3$$

$$F2 = F1 + F3 - F$$

$$F3 = F + F2 - F1.$$

Consequently, the stresses produced on the three lateral links 21, 31, 41 by the side force F can be reduced as a whole.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A wheel suspension in a road vehicle having a frame, comprising:
    a longitudinal arm extending substantially in a longitudinal direction of the vehicle and having a front end, a rear end, and an intermediate portion, said longitudinal arm also having, on said rear end, means for supporting the wheel and, on said intermediate portion, means for pivotally coupling the longitudinal arm to said frame;
    guide means for controlling movement of said longitudinal arm in a transverse direction of the vehicle while allowing said rear end of the longitudinal arm to move substantially in a vertical direction; and
    said guide means comprising a first lateral link having a first end coupled to said frame and a second end coupled to said front end of the longitudinal arm, said first lateral link extending substantially in the transverse direction of the vehicle, and link means coupling said frame and said longitudinal arm to each other and cooperating with said first lateral link.

2. A wheel suspension according to claim 1, wherein said first end of the first lateral link is positioned forwardly of said second end thereof with respect to the vehicle.

3. A wheel suspension according to claim 1, wherein said frame includes a pair of lateral rear frame members, a rear floor cross member extending in the transverse direction of the vehicle and interconnecting said rear frame members near front ends thereof, and a rear cross member extending in the transverse direction of the vehicle and interconnecting said rear frame members near rear ends thereof;
    said link means including second and third lateral links;
    said first end of the first lateral link being coupled to said rear floor cross member;
    said second lateral link having a first end coupled to one of said lateral rear frame members and a second end coupled to an upper portion of said rear end of said longitudinal arm; and
    said third lateral link having a first end coupled to said rear cross member and a second end coupled to a lower portion of said rear end of said longitudinal arm.

4. A wheel suspension according to claim 1, wherein said pivotally coupling means of the longitudinal arm includes a resilient bushing by which said longitudinal arm is resiliently pivotally coupled to said frame, said longitudinal arm having a substantial degree of rigidity against loads imposed longitudinally thereof, said link means including a second lateral link having a first end coupled to said frame and a second end coupled to said rear end of said longitudinal arm.

5. A wheel suspension according to claim 1, wherein said pivotally coupling means of the longitudinal arm includes a shaft and a resilient bushing fitted over said shaft, said shaft being supported on said frame, said longitudinal arm being mounted on an outer periphery of said resilient bushing, said shaft having an axis extending tangentially, as viewed in plan, to an arc having a center of curvature aligned with the center of rotation of the wheel.

6. A wheel suspension according to claim 1, wherein said vehicle comprises an automobile having a fuel tank mounted on said frame and a body including a floor;
    said fuel tank being disposed in a rear portion of the vehicle and beneath said floor;
    said longitudinal arm extending along one side wall of said fuel tank; and
    said first end of said first lateral link being coupled to said frame forwardly of said fuel tank.

7. A wheel suspension according to claim 6, wherein said link means includes a second lateral link having a first end coupled to said frame rearwardly of said fuel tank and a second end coupled to said rear end of said longitudinal arm.

8. A wheel suspension in a road vehicle having a frame, comprising:
    a longitudinal arm extending substantially in a longitudinal direction of the vehicle and having a front end, a rear end, and an intermediate portion, said longitudinal arm also having, on said rear end, means for supporting the wheel and, on said intermediate portion, means for pivotally coupling the longitudinal arm to said frame;
    guide means for controlling movement of said longitudinal arm in a transverse direction of the vehicle while allowing said rear end of said longitudinal arm to move substantially in a vertical direction; and
    said guide means comprising:
        a first lateral link having a first end coupled to said frame and a second end coupled to said front end of said longitudinal arm;
        a second lateral link having a first end coupled to said frame and a second end coupled to an upper portion of said rear end of said longitudinal arm; and
        a third lateral link having a first end coupled to said frame and a second end coupled to a lower portion of said rear end of said longitudinal arm; and
        said first, second and third lateral links each extending substantially in the transverse direction of the vehicle.

* * * * *

UNITED STATES PATENT AND TRADEMARK OFFICE
CERTIFICATE OF CORRECTION

PATENT NO. : 4,717,171
DATED : January 5, 1988
INVENTOR(S) : Yozo Kami et al.

It is certified that error appears in the above-identified patent and that said Letters Patent is hereby corrected as shown below:

Column 1, line 12, after "body" insert a period; change "in" to --In--.
Column 3, line 54, change "had" to --has--.
Column 4, line 59, after "connected" change "to" to --at--.
Column 10, line 10, after "point" insert --C--.

Signed and Sealed this

Twenty-eighth Day of June, 1988

Attest:

DONALD J. QUIGG

Attesting Officer

Commissioner of Patents and Trademarks